United States Patent Office 3,460,130
Patented Aug. 5, 1969

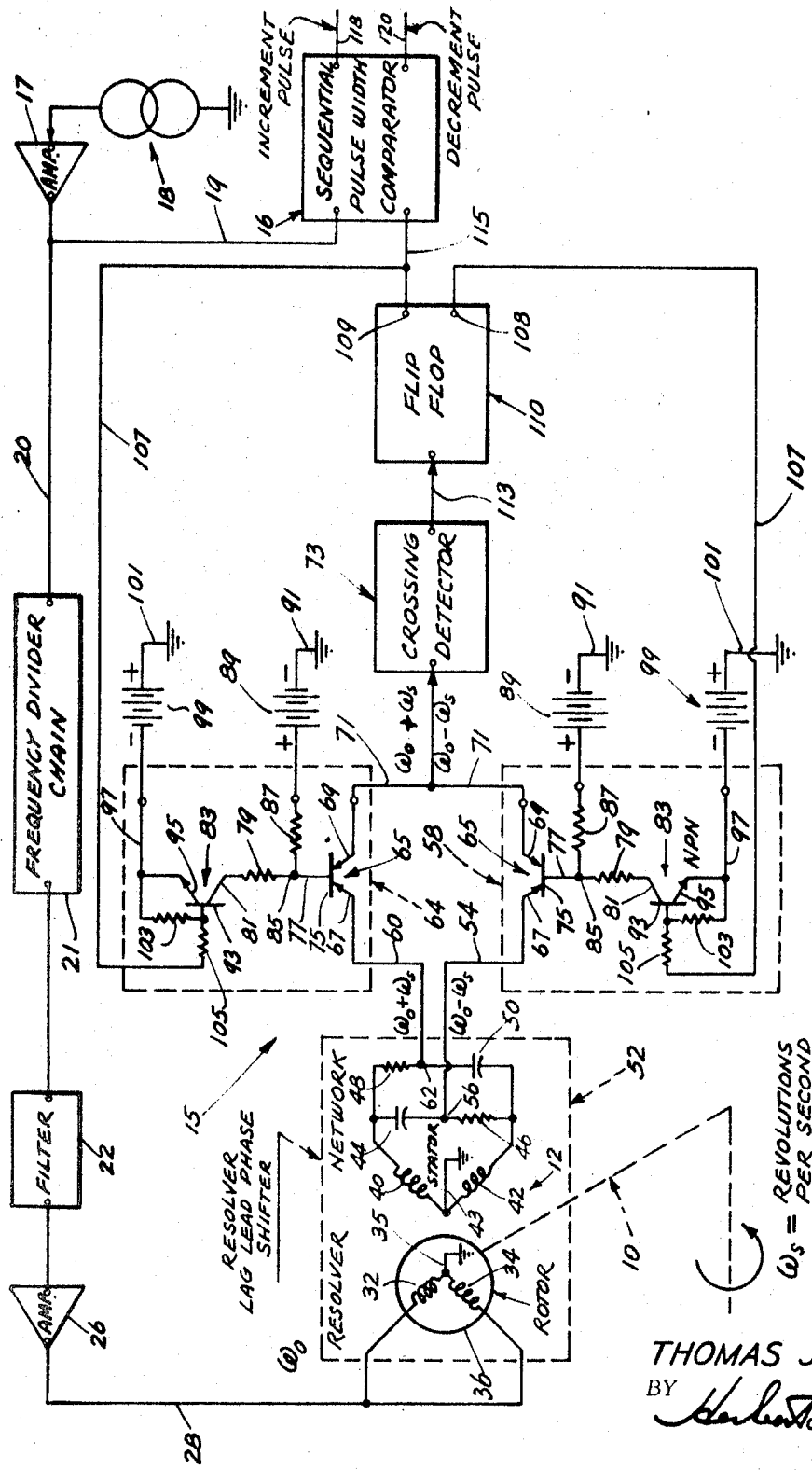

3,460,130
RESOLVER SHAFT ANGULAR VELOCITY TO PULSE WIDTH CONVERTER
Thomas J. Lavin, Midland Park, N.J., assignor to The Bendix Corporation, a corporation of Delaware
Filed June 14, 1965, Ser. No. 463,547
Int. Cl. H03k 13/02
U.S. Cl. 340—347        6 Claims

ABSTRACT OF THE DISCLOSURE

An improved device for the incremental encoding of rotational motion in which electrical signals are generated which may be used to determine the rotational velocity of a rotating component. In the improved device, a known frequency excitation voltage is applied to a resolver network including a resolver lag-lead phase shifter network effecting at a first output a first side band sinusoidal signal wave of a frequency equivalent to a sum of the angular velocity of a shaft and a carrier wave angular velocity and at a second output a second side band sinusoidal signal wave of a frequency equivalent to a difference between the shaft angular velocity and the carrier wave angular velocity; and in which device these outputs are switched selectively to a zero crossing detector which triggers a flip-flop. The flip-flop output goes to a comparator where it is compared with the excitation voltage to provide an appropriately generated increment or decrement pulse output.

---

This invention relates to improvements in a resolver to pulse width converter of an incremental encoder system and more particularly to improvements in a system of a type disclosed and claimed in a copending U.S. application Ser. No. 392,221, filed Aug. 26, 1964, by James E. Brook and Frank A. Hanusek, now U.S. Patent No. 3,353,175, granted Nov. 14, 1967, and Ser. No. 397,743, filed Sept. 21, 1964, by James E. Brook, now U.S. Patent No. 3,357,012, granted Dec. 5, 1967 and assigned to The Bendix Corporation, assignee of the present application.

The incremental encoding system to which the present invention relates is a simplified adaptation of a whole number conversion technique which utilizes the resolver as a precision phase shifter. With this approach, mechanical motion is transformed into corresponding phase variations which in turn are readily and accurately quantized on a pulse width sampling basis.

In the systems of the aforenoted copending applications, there are provided means whereby the shaft velocity of a resolver transducer (or its time integral, angle) may be superimposed upon the angular velocity of a sinusoidal carrier wave through a resolver phase shifter so as to provide two separate side band signals, one side band signal being equivalent to the sum of the shaft velocity and carrier wave frequency and the other side band signal being equivalent to the difference between the shaft velocity and the carrier wave frequency, together with a pair of extremely accurately matched zero crossing detectors and a coincidence gate operated thereby and arranged to effect an output pulse defining a reference condition upon both of the sinusoidal side band signal waves simultaneously passing through the referenced condition.

In the resolver incremental encoder system of the aforenoted copending applications, it has been found difficult to meet the requirement of an extremely accurately matched pair of crossover detectors. Thus an object of the present invention is to eliminate the need for such matched crossover detectors by utilizing a single zero crossing detector with feedback controlled switches to generate the start and stop pulses to trigger the operation of the zero crossing detector and thereby a pulse width flip-flop device controlled by the zero crossing detector and effective to render the feedback control switches alternately conductive of one or the other of the side band signals to the zero crossing detector.

Another object of the invention is to provide a system utilizing a resolver or synchro and Scott T arrangement as the basic mechanical to electrical transducer in which mechanical motion is resolved into electrical sin $\theta$ and cos $\theta$ signal components which are fed to a pulse width converter including precision resistance-capacitor networks to provide variable phase constant amplitude signals for controlling a detection circuitry having a pair of matched solid state switches alternately effective to cause a single crossover detector to sample one or the other of the phase shifted signals for controlling the operation of the single crossover detector so as to provide a complementary pulse to operate a conventional flip-flop device each time one of the sample signals crosses a specified voltage level in which the flip-flop device in turn effects a feedback signal to control the alternate sampling operation of the solid state switches.

Another object of the invention is to provide such a novel pulse width converter which is extremely accurate (better than one part in 8,000) and virtually independent of the effects of drift in the crossover detection level of the single required crossing detector.

These and other objects and features of the invention are pointed out in the following description in terms of the embodiments thereof which are shown in the accompanying drawing. It is to be understood, however, that the drawing is for the purpose of illustration only and is not a definition of the limits of the invention. Reference is to be had to the appended claims for this purpose.

The drawing is a schematic block diagram of a resolver incremental encoder system embodying the improved resolver to pulse width converter of the present invention.

Referring to the drawing, there is illustrated a resolver incremental encoder system which is arranged to transfer the angular input of a shaft 10 into an absolute, whole word readout or incremental signal indicative of the angular input data applied to the shaft 10. A two pole resolver 12 has been shown schematically so as to simplify the presentation although a multipole resolver may normally be used to implement a practical system where both high accuracy as well as high resolution are desired.

The resolver incremental encoder to which the present invention is applicable is comprised of: a timing section, conversion circuitry which may be subdivided on a functional basis into two principal sections including a resolver to pulse width converter 15 and a sequential pulse width comparator 16 as shown in the drawing. The subject of the present invention is directed to improvements in the resolver to pulse width converter 15. The other sections of the system are explained generally herein to set forth the operational environment of the invention.

Timing section

The timing section fills two primary system requirements. The first requirement is to furnish the resolver 12 with a sinusoidal alternating current excitation, while the second requirement which must be filled by the timing section is that it provide a source of suitably scaled quantizing pulses which remain fixed in frequency relative to the excitation of the resolver 12. The required frequency relationship for proper scaling is achieved by a proper selection of the clock frequency and the division ratio of the excitation current for the resolver 12.

This is accomplished by the provision of a crystal controlled oscillator 18 of conventional type and which serves as a fundamental system clock. Output pulses from the oscillator 18 are applied through a suitable amplifier 17 to an output conductor 19 to the pulse width comparator 16 of a conventional type to effect a timing measurement of the duration of the sampled signals applied thereto.

Resolver to pulse width converter section

The output from the oscillator 18 is further applied through a conductor 20 to a conventional frequency divider chain 21 to obtain a square wave output. The square wave output is then fed to a low pass filter 22 which provides a pure source of sinusoidal alternating current excitation suitable for power amplification.

The power amplifier indicated in the drawing by the numeral 26 connected to the output of the filter 22 provides suitable alternating current excitation through a conductor 28 to a winding 32 and a winding 34, both of which are ground connected at 35 and carried by a rotor element 36 of the resolver 12.

The windings 32 and 34 may be arranged in spaced quadrature and in cooperative relation with stator windings 40 and 42 both of which are ground connected at 43. The stator windings 40 and 42 are also arranged in space quadrature and are inductively coupled to the rotor windings 32 and 34 of the resolver 12, in a variable coupling relation.

There is further provided a lag-lead phase shifter network in which a capacitor 44 and a resistor element 46 are serially connected across the opposite output terminals of the stator windings 40 and 42 of the resolver 12 while a second resistor 48 and capacitor 50 are connected across the aforesaid opposite output terminals of the stator windings 40 and 42 of the resolver 12 so as to constitute a resolver lag-lead phase shifter network 52. There is further provided an output line 54 leading from a point 56 intermediate the serially connected capacitor 44 and resistor 46 to an input of a solid state switch 58, operable as hereinafter explained.

Another output line 60 leads from a point 62 intermediate the serially connected resistor 48 and capacitor 50 to an input of a second matched solid state switch 64 identical to the solid state switch 58 in which, as shown in the drawing, corresponding parts are indicated by like numerals.

The alternating current applied to the rotor windings 32 and 34 of the resolver 12 from the source of alternating current 18 is shown in the drawing as represented by the symbol $W_o$ which is equal to the carrier angular velocity while the angular velocity imparted to the rotor 36 by the shaft 10 is indicated by the symbol $W_s$ as equal to the revolutions per second of the input shaft 10.

Further, the electrical output signals from the resolver lag-lead phase shifter 52 are separate side band sinusoidal signal waves $(W_o+W_s)$ in which the output line 54 has a side band signal wave equal to $W_o-W_s$ upon angular movement of the shaft 10 in one sense and a side band signal waves $(W_o\pm W_s)$ in which the output line 54 has the shaft 10 in an opposite sense, while output line 60 has another side band signal wave equal to $W_o+W_s$ upon the angular movement of the shaft 10 in said one sense and a side band signal wave equal to $W_o-W_s$ upon the angular movement of the shaft 10 in said opposite sense.

Through the operation of the resolver lag-lead phase shifter 52, the velocity equal to $W_s$ of the resolver shaft 10 (or its time integral, angle) is superimposed, in accordance with the Doppler principle, upon the carrier velocity $W_o$ supplied by the source of alternating current 18. Upon the angular movement or rotation of the shaft 10 in the one sense shown, the separated side band signals $W_o-W_s$ and $W_o+W_s$ applied through the output lines 54 and 60, respectively, are then applied to the inputs of the matched solid state switches 58 and 64 for purposes which will be explained hereinafter.

The solid state switches 58 and 64 are of identical construction and as shown in the drawings corresponding parts have been indicated by like numerals. The solid state switch includes a bilateral transistor 65 having an emitter element 67 connected, in the case of the switch 58, to the conductor 54, and in the case of the switch 64, to the conductor 60. The transistor 65 also includes an emitter element 69 connected to a conductor 71 leading to an input of a crossing detector 73 which may be of a conventional type or of a type such as disclosed in a now abandoned U.S. application Ser. No. 392,154, filed Aug. 26, 1964, by James E. Brook, and assigned to The Bendix Corporation, assignee of the present invention.

The bilateral transistor 65 also includes a base element 75 connected through a conductor 77 to a resistor 79 leading to a collector element 81 of an NPN type transistor 83. There is also connected to the conductor 77 at a point 85, a resistor 87 leading to a positive terminal of a battery 89 having a negative terminal connected through a conductor 91 to ground.

The transistor 83 acts to control the conductivity of the bilateral transistor 65 and includes a base element 93 and an emitter element 95. The emitter element 95 is connected through conductor 97 to a negative terminal of the battery 99 having a positive terminal connected through a conductor 101 to ground. There is also connected across the base element 93 and the emitter element 95 a resistor 103.

Further, there is connected to the base element 93 through a resistor 105, a conductor 107 which in the case of the switch 58 leads from an output terminal 108 of a flip-flop circuit 110 which may be of a conventional type having an input conductor 113 leading from the output of the crossing detector 73. In the case of the switch 64, the corresponding conductor 107 leads from a separate output terminal 109 of the flip-flop circuit 110.

In the operation of the pair of matched solid state switches 58 and 64, it will be seen that one or the other of the output conductors 107 leading from the respective output terminals 108 and 109 of the flip-flop circuit 110 will have applied thereto a positive potential while the other of the output conductors 107 will have a negative bias applied thereto.

A positive potential applied, for example, at the output terminal 108 of the flip-flop 110 will be applied through conductor 107 through the solid state switch 58 causing the control transistor 83 to become conductive from the collector 81 to the emitter 95 whereupon a negative bias will be applied to the base element 75 of the bilateral transistor 65 rendering the bilateral transistor 65 conductive from the emitter element 67 to the emitter element 69 so that a side band signal $W_o-W_s$ applied at conductor 54 will then be effectively conductor 71 leading to the input of the crossing detector 73.

Further, in the example given, there will then be applied a negative bias to the output terminal 109 and through the output conductor 107 leading from the flip-flop circuit 110 to the solid state switch 64. This negative bias will cause the control transistor 83 of the solid state switch 64 to become non-conductive from the collector 81 to the emitter 95 and in turn apply a positive potential to the base 75 of the bilateral transistor 65 to cause the bilateral transistor 65 to be ineffective to connect the input conductor 60 to the output conductor 71.

Now upon the crossing detector 73 sensing the crossover detection level of the side band signal $W_o-W_s$ thus applied to the input of the crossing detector 73 through the solid state switch 58, there is then applied a pulse by the crossing detector 73 through the conductor 113 to the input of the flip-flop circuit 110 which is then effective to substitute for the positive potential previously applied to the output conductor 107 of the solid state switch 58 a negative bias while a positive potential will then be applied through the output conductor 107 leading to the solid state switch 64 in place of the previous negative bias whereupon the solid state switch 64 becomes conductive so as to operably connect the side band signal $W_o+W_s$ applied to the conductor 60 to the input conductor 71 leading to the input of the crossing detector 73, while the negative bias applied to the control conductor 107 leading to the solid state switch 58 will render the switch 58 effective to open the circuit between the input conductor 54 and the output conductor 71 leading to the input of the crossing detector 73.

Further, the alternate negative and positive charges applied to the output terminal 109 of the flip-flop circuit 110 connected through conductor 107 to the switch 64 will be connected through a conductor 115 to the input of a sequential pulse width comparator 16 which may be of a conventional type.

Sequential pulse width comparator section

The sequential pulse width comparator 16 is operably connected through a conductor 19 to the output of the timing section 18 so that the timing section is effective to apply to the sequential pulse width comparator 16 suitably scaled quantizing pulses which remain fixed in frequency relative to the resolver excitation. The required frequency relation for proper scaling is achieved by the proper selection of the clock frequency of the source 18 and the division ratio effected through the frequency divider chain 21 in the excitation frequency of the resolver 12.

The balanced circuit arrangement, as shown in the drawing, produces a train of pulses at the conductor 115 which vary in duty cycle or width as a function of the relative position of the rotor 36 in the resolver 12. The precision of the resolver to the pulse width conversion circuitry is attributable to the fact that the ultimate limitations of performance are governed by the relative match between corresponding components and signals rather than their absolute values.

The sequential pulse width comparator 16 functions to resolve the incoming pulse width signals applied through conductor 115 to the required incremental ratio as measured by the quantizing pulses applied by the timing section 14 through the conductor 19.

Further in a conventional manner the pulse width comparator 16 serves to make a relative comparison of the most recent pulse width sample applied through conductor 115 with the previous pulse width sample and to apply appropriately generated incrementing or decrementing pulses through output conductors 118 and 120.

The invention, as heretofore explained, relates to the resolver to pulse width converter section 15 and therefore no further explanation is deemed necessary of the sequential pulse width comparator section which may be of a conventional type.

Operation

The resolver and double resistance-capacitance networks operate in concert to produce two output signals designated as $W_o+W_s$ and $W_o-W_s$. These two signals are constant amplitude sinusoids which vary in phase opposition. Thus in the case of a zero velocity input condition, both signals rotate at a constant counterclockwise rate of $W_o$ corresponding to the excitation frequency and thereby maintain a fixed relative phase relationship.

When a constant velocity $W_s$ is imposed on the input shaft, the two signals rotate $\pm W_s$ relative to the carrier $W_c$ thereby producing a $2W_s$ rate relative to each other. The signals $W_o+W_s$ and $W_o-W_t$ are the separated upper and lower side bands of a suppressed carrier system.

The low offset bilateral switch arrangement of 58 and 64 feeds either of the two signals $W_o+W_s$ or $W_o-W_s$ into the single zero crossing detector 73. Each detected crossing results in the generation of a pulse which in turn complements the pulse width flip-flop. The outputs at terminals 108 and 109 of the pulse width flip-flop 110 are fed back to control the state of the low offset switches 58 and 64 thus causing a continuous alternating between the two inputs to the crossing detector 73. The resulting pulse train is fed to the sequential pulse width comparator 16 for subsequent processing.

The single zero crossing detector and matched switch arrangement employed in this encoder has been used in single speed systems to achieve overall accuracies on the order of one part in eight thousand. The switches are operated at very low current levels by providing a high input impedance at the zero crossing detector. The stability of the zero crossing detector is not a critical consideration in the balanced conversion arrangement. This highly desirable aspect of the approach is achieved by virtue of the fact that any drift in the detecting level will effect both signals equally. A slow drift would exhibit its effect by causing a harmless advancement or retardation in the position of the pulse width, but would not disturb its duration, and it is its duration or width which carries the information or sampled data which is measured by the sequential pulse width comparator 16.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an incremental encoder system of a type comprising a resolver transducer including a set of rotor windings and a set of stator windings in inductive relation, a source of a constant frequency alternating current for energizing one of the set of windings so as to induce a sinusoidal carrier wave of constant angular velocity in the other of said set of windings, a control shaft for angularly positioning the set of rotor windings in relation to the set of stator windings and at variable angular velocity so that the angular velocity of the shaft may be superimposed upon the angular velocity of the sinusoidal carrier wave, a lag-lead phase shifter network connected across an output of the other set of windings, the lag-lead phase shifter network including first and second output means, the first output means providing a first side band sinusoidal signal wave of a frequency equivalent to a sum of the shaft angular velocity and carrier wave angular velocity, and the second output means providing a separated second side band sinusoidal signal wave of a frequency equivalent to a difference between the shaft angular velocity and the carrier wave angular velocity; the improvement comprising a crossing detector, a first switching means operative in a first sense to connect the first output means to the crossing detector, a second switching means operative in a second sense to connect the second output means to the crossing detector, said first and second switching means being alternately operative in said first and second senses, and a gating means operative by said crossing detector and arranged to effect an output pulse defining a reference crossing condition upon the effective side band sinusoidal signal wave passing through the reference crossing condition.

2. The combination defined by claim 1 including feedback means operatively connecting the gating means to the first and second switching means to render the same alternately effective in said first and second senses.

3. In an incremental encoder system of a type including a resolver transducer including a rotor having a pair of windings arranged in spaced quadrature, a stator having a pair of windings arranged in spaced quadrature, said pair of rotor and stator windings being variably inductively coupled, a source of a constant frequency alternating current for energizing a first pair of said windings so as to induce a sinusoidal carrier wave in a second pair of said windings, a shaft for angularly positioning the pair of rotor windings in relation to the pair of stator windings at a variable angular velocity so as to vary the inductive coupling between said rotor and stator windings and superimpose the angular velocity of the shaft upon the angular velocity of the sinusoidal carrier wave, a lag-lead phase shifter network connected across the output conductors of said second pair of windings, the lag-lead phase shifter network including first and second output means; the improvement comprising means operatively connected to said first and second output means to alternately render said output means selectively effective, a voltage level detector means connected to said operative means, and gating means responsive to operation of said detector means to control said operative connecting means.

4. The combination defined by claim 3 including means operative by said gating means to effect a count signal dependent upon the duration of any one signal applied through the gating means.

5. In a device of a type including a transducer, means for providing a sinusoidal carrier wave of constant angular velocity for energizing said transducer, first and second outputs for said transducer, a shaft angularly movable for adjusting said transducer, said shaft being movable at a variable angular velocity, said transducer including first means operative by said shaft to superimpose the angular velocity of the shaft upon the angular velocity of said sinusoidal carrier wave, and second means operatively connected to said first means for effecting at said first output a first side band sinusoidal signal wave of a frequency equivalent to a sum of the shaft angular velocity and carrier wave angular velocity and at said second output a second side band sinusoidal signal wave of a frequency equivalent to a difference between the shaft angular velocity and the carrier wave angular velocity; the improvement comprising a voltage level detector means, and switching means to alternately connect said first and second outputs to said voltage level detector means.

6. The combination defined by claim 5 including a gating means operative by said voltage level detector means, and feedback means operatively connecting the gating means to said switching means so as to effect the alternate operation thereof dependent upon the voltage level of the effective side band signals sensed by the voltage detector means.

References Cited
UNITED STATES PATENTS
2,894,256  7/1959  Kronacher _____ 340—347

MAYNARD R. WILBUR, Primary Examiner

CHARLES D. MILLER, Assistant Examiner

U.S. Cl. X.R.

318—20; 340—198